US005826423A

United States Patent [19]

Lockyer et al.

[11] Patent Number: 5,826,423

[45] Date of Patent: Oct. 27, 1998

[54] DUAL FUEL INJECTION METHOD AND APPARATUS WITH MULTIPLE AIR BLAST LIQUID FUEL ATOMIZERS

[75] Inventors: John F. Lockyer; Gareth W. Oskam, both of San Diego; Douglas C. Rawlins, Murrieta, all of Calif.

[73] Assignee: Solar Turbines Incorporated, San Diego, Calif.

[21] Appl. No.: 751,771

[22] Filed: Nov. 13, 1996

[51] Int. Cl.[6] ................................ F02C 3/20; F02G 3/00

[52] U.S. Cl. ........................ 60/39.463; 60/39.06; 60/737; 60/746; 60/747; 60/748; 239/424.5; 239/419.3

[58] Field of Search .................................. 60/39.06, 737, 60/739, 740, 742, 746, 747, 748, 39.463; 239/424.5, 419.3, 425, 404, 405, 406, 416.4, 416.5, 423, 433, 434.5

[56] References Cited

U.S. PATENT DOCUMENTS

| | | | |
|---|---|---|---|
| 2,618,928 | 11/1952 | Nathan | 60/737 |
| 4,050,238 | 9/1977 | Holzapfel | 60/737 |
| 4,946,475 | 8/1990 | Lipp et al. | 239/424.5 |
| 4,977,740 | 12/1990 | Madden et al. | 239/424.5 |
| 5,102,054 | 4/1992 | Halvorsen | 239/424.5 |
| 5,218,824 | 6/1993 | Cederwall et al. | 60/737 |
| 5,404,711 | 4/1995 | Rajput | 60/39.463 |
| 5,408,825 | 4/1995 | Foss et al. | 60/39.463 |
| 5,660,044 | 8/1997 | Bonciani et al. | 60/737 |

FOREIGN PATENT DOCUMENTS

| | | | |
|---|---|---|---|
| 1178452 | 11/1984 | Canada | 60/39.463 |

*Primary Examiner*—Charles G. Freay
*Attorney, Agent, or Firm*—Marshall, O'Toole, Gerstein, Murray&Borun; Larry G. Cain

[57] ABSTRACT

A dual fuel injector for injecting liquid and/or gaseous fuel into a gas turbine engine includes a plurality of hollow spoke members for injecting gaseous fuel that are located upstream of a plurality of main air swirling vanes that are in turn upstream of a plurality of air-blast atomizers for injecting main liquid fuel. A pilot fueling arrangement is provided that is capable of starting the gas turbine engine using either gaseous or liquid fuel. The injector includes a labyrinth-shaped cooling passage capable of providing cooling air to cylindrical walls of an injector centerbody.

30 Claims, 6 Drawing Sheets

DUAL FUEL INJECTION METHOD AND APPARATUS WITH MULTIPLE AIR BLAST LIQUID FUEL ATOMIZERS

TECHNICAL FIELD

The present invention relates to fuel injectors for gas turbine engines. More particularly, the invention relates to a dual fuel injector that can operate using liquid and/or gaseous fuel.

BACKGROUND ART

The use of fossil fuel as the combustible fuel in gas turbine engines results in the combustion products of carbon monoxide, carbon dioxide, water vapor, smoke, particulates, unburned hydrocarbons, nitrogen oxides, and sulfur oxides. Of these above products, carbon dioxide and water vapor are considered normal and unobjectionable. In most applications, governmental imposed regulation further restrict the amount of pollutants being emitted in the exhaust gases.

In the past, the majority of the products of combustion have been controlled by design modifications. For example, smoke has normally been controlled by design modifications in the combustor, particulates are normally controlled by traps and filters, and sulfur oxides are normally controlled by the selection of fuels being low in total sulfur. This leaves carbon monoxide, unburned hydrocarbons, and nitrogen oxides as the emissions of primary concern in the exhaust gases being emitted from the gas turbine engine.

Oxides of nitrogen are produced in two ways in conventional combustion systems. For example, oxides of nitrogen are formed at high temperatures within the combustion zone by the direct combination of atmospheric nitrogen and oxygen, and by the presence of organic nitrogen in the fuel. The rates with which nitrogen oxides form depend upon the flame temperature and, consequently, a small reduction in flame temperature can result in a large reduction in the nitrogen oxides.

Past and some present systems providing means for reducing the maximum temperature in the combustion zone of a gas turbine combustor have included water injection. An injector nozzle used with a water injection system is disclosed in U.S. Pat. No. 4,600,151 issued on Jul. 15, 1986, to Jerome R. Bradley. The injector nozzle disclosed includes an annular shroud means operatively associated with a plurality of sleeve means, one inside the other in spaced apart relation. The sleeve means form a liquid fuel-receiving chamber and a water or auxiliary fuel-receiving chamber positioned inside the liquid fuel-receiving chamber. The fuel-receiving chamber is used to discharge water or auxiliary fuel in addition or alternatively to the liquid fuel. The sleeve means further forms an inner air-receiving chamber for receiving and directing compressor discharged air into the fuel spray cone and/or water or auxiliary fuel to mix therewith.

Another fuel injector is disclosed in U.S. Pat. No. 4,327,547 issued May 4, 1982, to Eric Hughes et al. This fuel injector includes means for water injection to reduce emissions of oxides of nitrogen, and an outer annular gas fuel duct with a venturi section with air purge holes to prevent liquid fuel entering the gas fuel duct. Further included is an inner annular liquid fuel duct having inlets for water and liquid fuel. The inner annular duct terminates in a nozzle, and a central flow passage through which compressed air also flows terminates in a main diffuser having an inner secondary diffuser. The surfaces of both diffusers are arranged so that they are washed by the compressed air to reduce or prevent the accretion of carbon to the injector. The diffusers in effect form a hollow pintle.

The above systems and nozzles used therewith are examples of attempts to reduce the emissions of oxides of nitrogen. However, the nozzles described above fail to efficiently mix the gaseous fluids and/or the liquid fluids to control the emissions of oxides of nitrogen emitted from the combustor.

An improved dual fuel injector nozzle for reducing the emission of oxides of nitrogen, carbon monoxide, and unburned hydrocarbons within the combustion zone of a gas turbine engine is disclosed in U.S. Pat. No. 5,404,711 issued Apr. 11, 1995, to Amjad P. Rajput. The injector provides a series of premixing chambers that are serially aligned with respect to one another.

Another problem encountered in fuel injector nozzles for gas turbine engines is excessive temperature of a tip portion of the fuel injector nozzle that can result in oxidation, cracking and/or buckling of the tip portion. A fuel injection nozzle having structure to provide improved tip cooling without requiring increased cooling air quantities and with reduced emissions of CO and NOx is disclosed in U.S. Pat. No. 5,467,926 issued Nov. 21, 1995, to Dennis D. Idleman et al. The structure includes a shell having an inner member positioned therein forming a first chamber therebetween, and an end piece forming a second chamber between the inner member and the end piece. An inner body has a plurality of first angle passages formed therein and communicates between the second chamber and a passage. A flow of combustor air through the second chamber contacts an air side of the end piece resulting in a combustor side being cooled. The end piece includes a plurality of effusion cooling holes therein that provide an air-sweep which interfaces the end piece and hot combustion gases thus cooling the combustion side of the end piece.

DISCLOSURE OF THE INVENTION

In accordance with one aspect of the present invention, a fuel injector comprises a plurality of fuel atomizers, each adapted to carry a flow of fuel for mixing with a flow of air and each including an inner air passage, an outer air passage, and a fuel passage disposed between the inner air passage and the outer air passage.

The fuel injector may further include a main air passage having a central axis and a centerbody disposed radially inwardly of the main air passage. The fuel atomizers are mounted to the centerbody and spaced around the central axis and carry the flow of fuel to the main air passage. Each fuel atomizer may be canted at an angle, for example from about 45.0° to about 90.0°, with respect to the central axis. Each fuel passage may include a vortex generating device, such as one or more swirler blades, in the flow of fuel. Each outer air passage preferably includes a vortex generating device in the flow of air, such as one or more swirler blades.

In accordance with another aspect of the present invention, a fuel injector comprises a main air passage having a central axis, a centerbody disposed radially inwardly of the main air passage, and a plurality of main fuel atomizers mounted to the centerbody and spaced around the central axis for carrying a flow of fuel to the main air passage.

In accordance with yet another aspect of the present invention, a dual fuel injector comprises a gaseous main fuel supply and a main air passage. The main air passage includes a vortex generating device and the gaseous main fuel supply comprises a plurality of gaseous fuel nozzles located upstream of the main air passage vortex generating device.

In accordance with still another aspect of the present invention, a dual fuel injector comprises an unperforated injector centerbody tip, including a cylindrical wall, and a cooling air passage for providing cooling air to the cylindrical wall. The cooling air passage is preferably labyrinth-shaped.

In accordance with yet another aspect of the present invention, a method of mixing main liquid fuel with air in a fuel injector, where the fuel injector includes a main liquid fuel feed line and a fuel-air mixing chamber, comprises the steps of: providing a plurality of atomizers in the fuel injector, each including an atomizer fuel passage in fluid communication with the main liquid fuel feed line and having one or more separate air passages; and introducing fuel from the atomizer fuel passages and air from the air passages through the atomizers into the fuel-air mixing chamber for mixture with additional air passing through the fuel-air mixing chamber.

In accordance with yet another aspect of the present invention, a method of mixing main liquid fuel with air in a fuel injector, where the fuel injector includes a main liquid fuel feed line and a fuel-air mixing chamber, comprises the steps of: providing a plurality of atomizers, each including an annular atomizer fuel passage in fluid communication with the main liquid fuel feed line, a central air passage disposed radially inwardly of the annular atomizer fuel passage, and an outer air passage disposed radially outwardly of the annular atomizer fuel passage; and, for each of the atomizers: introducing fuel into the annular atomizer fuel passage to create a cylindrically shaped film of fuel that exits the annular atomizer fuel passage; mixing the fuel film externally of the annular atomizer fuel passage with air introduced through the central air passage and the outer air passage to create a plurality of fuel droplets mixed with air ejected from the atomizer into the fuel-air mixing chamber; and introducing additional air into the fuel-air mixing chamber and mixing the additional air with the fuel droplets mixed with air after ejection from the atomizer into the fuel-air mixing chamber.

BRIEF DESCRIPTION OF THE DRAWINGS

Other features and advantages are inherent in the apparatus and method claimed and disclosed or will become apparent to those skilled in the art from the following detailed description in conjunction with the accompanying drawings in which:

BEST MODE FOR CARRYING OUT THE INVENTION

Figure 1:
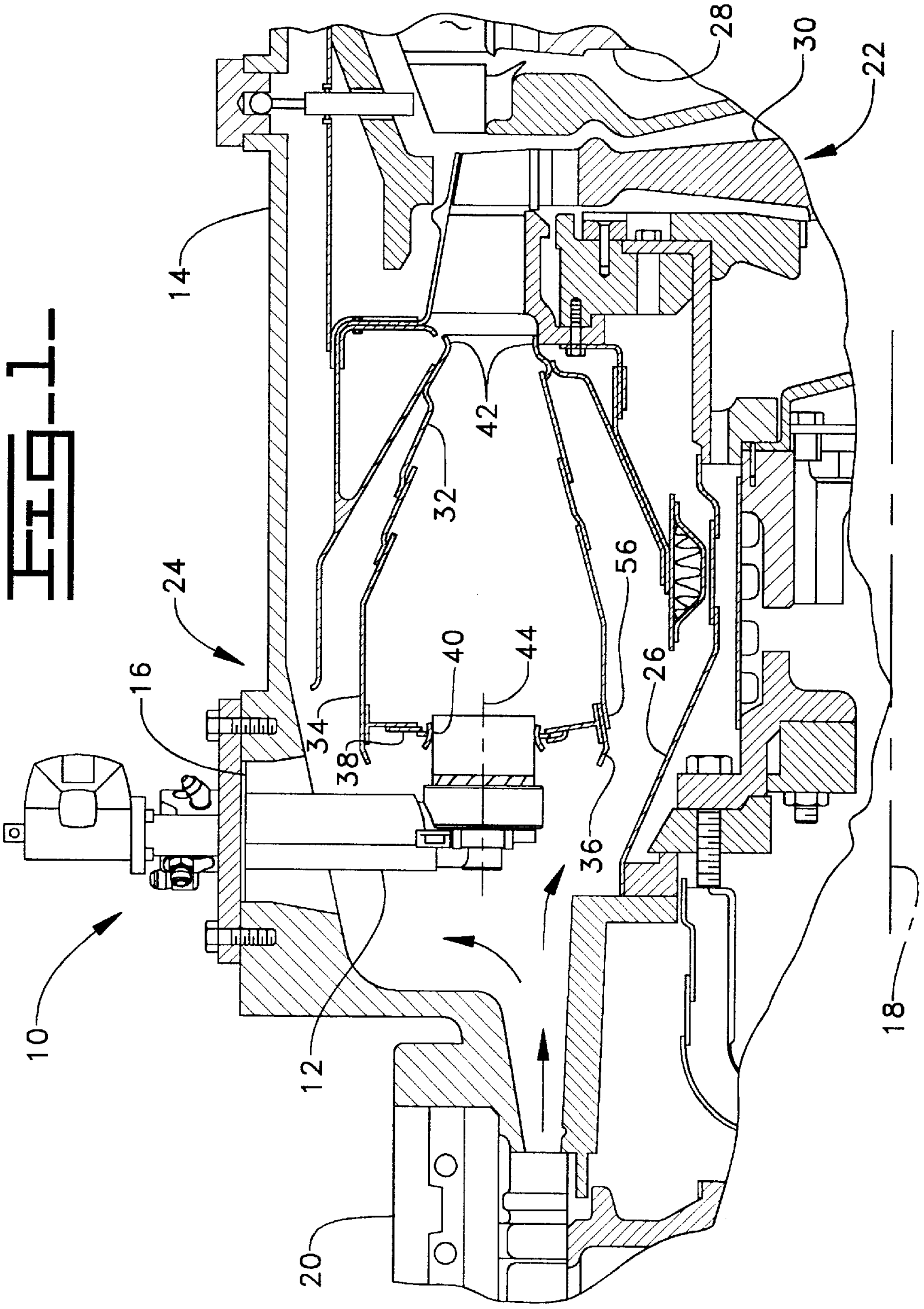
FIG. 1 is a partially sectioned side view of a gas turbine engine having a dual fuel injector according to the present invention.
Figure 2:
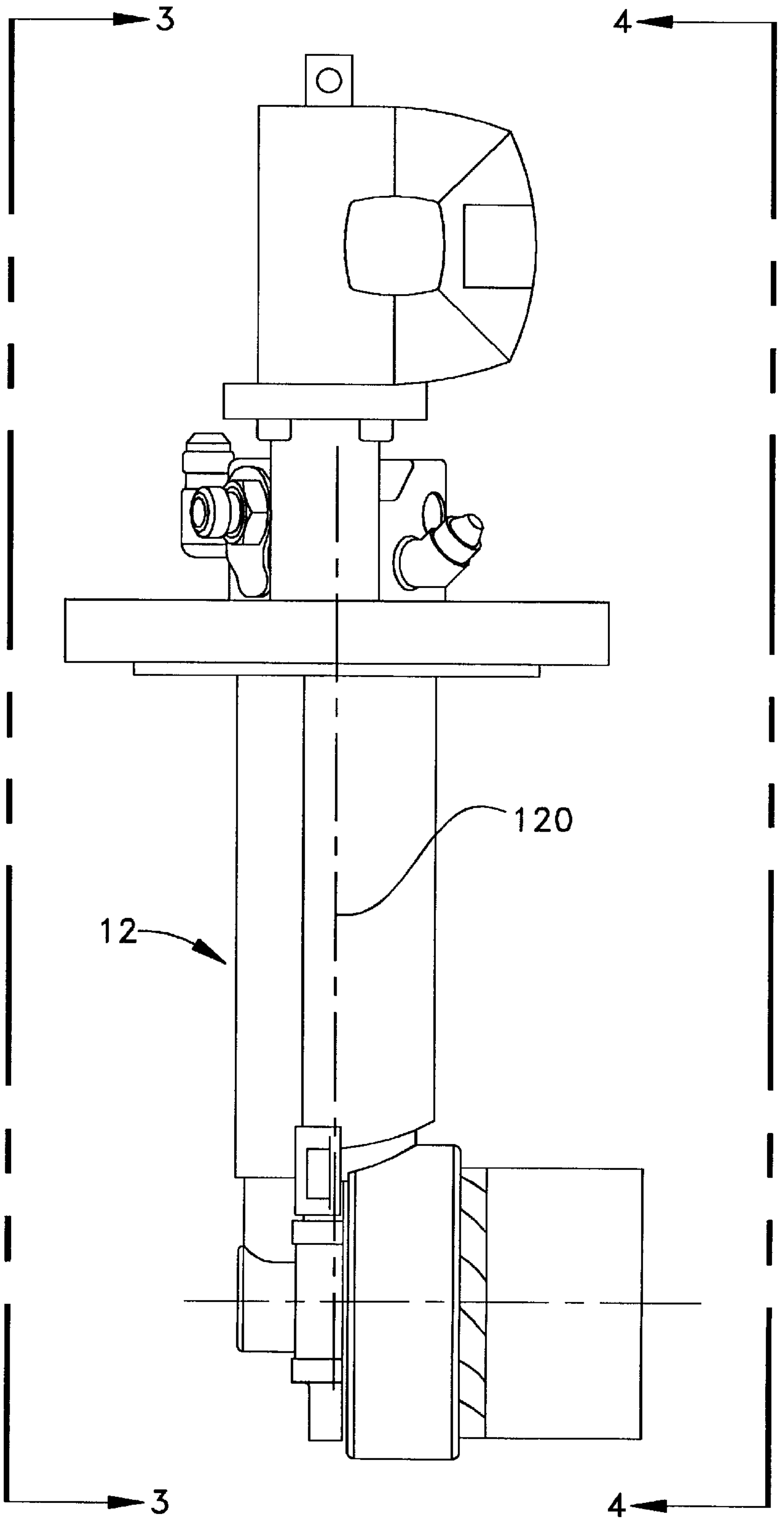
FIG. 2 is an enlarged side view of the dual fuel injector shown in FIG. 1.

As seen in FIG. 1, a gas turbine engine 10 has a dual fuel (gaseous/liquid) premix injector 12. The gas turbine engine 10 includes an outer housing 14 having a plurality of openings 16 therein, each having a pre-established position in relationship to one another. The openings 16 are distributed about a central axis 18 of the outer housing 14. A dual fuel premix injector 12 extends through each of the openings 16. For convenience, however, only one dual fuel premix injector 12 and one opening 16 are shown. Accordingly, the dual fuel premix injector 12 is positioned in one of the openings 16 and is supported by the outer housing 14 in a conventional manner.

The outer housing 14 is positioned about a compressor section 20 centered about the central axis 18. A turbine section 22 is centered about the central axis 18, and a combustor section 24 is centered about the central axis 18 and is interposed between the compressor section 20 and the turbine section 22. The gas turbine engine 10 has an inner case 26 axially aligned about the central axis 18 and disposed radially inwardly of the combustor section 24.

The turbine section 22 includes a power turbine 28 having an output shaft (not shown) connected thereto for driving an accessory component (not shown) such as a generator or a pump. Another portion of the turbine section 22 includes a gas producer turbine 30 connected in driving relationship to the compressor section 20. When the gas turbine engine 10 is operating, a flow of compressed air exits the compressor section 20 and is used for cooling, for atomizing liquid fuel, such as number 2 diesel fuel, and for mixing with a combustible fuel for pilot and main combustion in the combustor section 24, as described in further detail below.

The combustor section 24 includes an annular combustor 32 that is radially spaced a pre-established distance from the outer housing 14 and is supported from the outer housing 14 in a conventional manner. The annular combustor 32 has an annular outer shell 34 that is coaxially positioned about the central axis 18, an annular inner shell 36 that is positioned radially inwardly of the annular outer shell 34 and coaxially positioned about the central axis 18, an inlet end portion 38 having a plurality of generally evenly spaced openings 40 therein, and an outlet end portion 42. Each of the openings 40 has one of the dual fuel premix injectors 12, having an injector central axis 44, generally positioned therein in fluid communication with the inlet end portion 38 of the annular combustor 32. As an alternative to the annular combustor 32, a plurality of can-type combustors or a side canular combustor could be incorporated without changing the essence of the invention.

Figure 6:
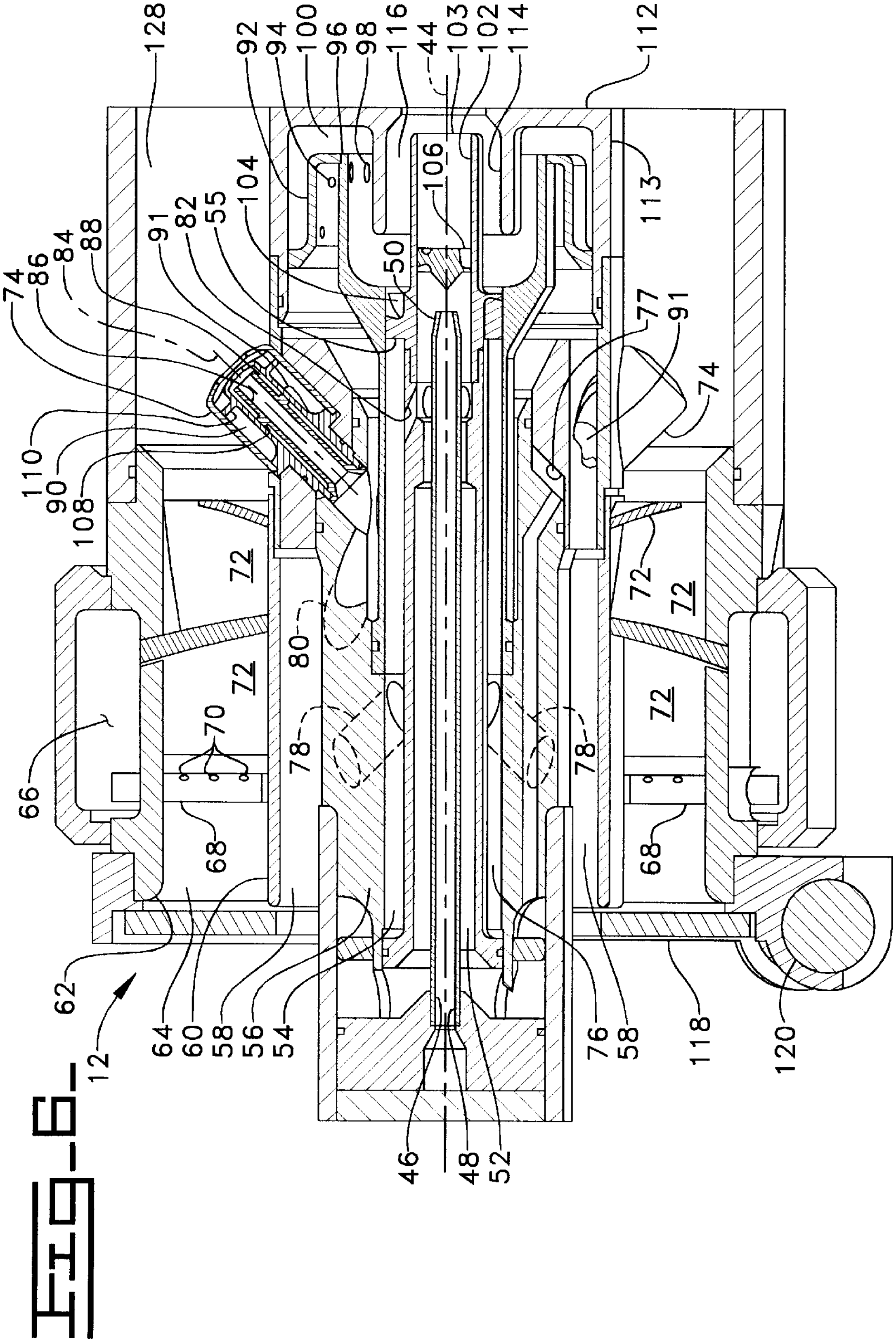
FIG. 6 is an enlarged cross-sectional view of a portion of the dual fuel injector taken along lines 6—6 of FIG. 4.

As further shown in FIG. 6, each of the dual fuel premix injectors 12 includes a liquid pilot fuel feed line 46 for introducing liquid pilot fuel generally along the injector central axis 44. The liquid pilot fuel feed line 46 has an inlet end 48 and a tapered outlet end 50. An annular air assist passage 52 surrounds the liquid pilot fuel feed line 46 and is coaxially positioned about the injector central axis 44. An annular pilot gaseous fuel passage 54 surrounds the annular air assist passage 52, has an annular pilot gaseous fuel passage outlet 55, and is coaxially positioned about the injector central axis 44.

An injector centerbody 56 surrounds the annular pilot gaseous fuel passage 54. A secondary air passage 58 surrounds the injector centerbody 56 and is in turn surrounded by a first cylindrical wall 60 that, together with a second cylindrical wall 62 defines a main air passage 64. An annular main gaseous fuel manifold cavity 66 surrounds the second cylindrical wall 62 and is in fluid communication with a plurality of hollow spoke members 68, each having a plurality of passages 70 therein for introducing gaseous fuel, such as methane gas, from the annular main gaseous fuel manifold cavity 66 into the main air passage 64. The main air passage 64 includes a plurality of main air swirling vanes 72 disposed therein.

Figure 4:
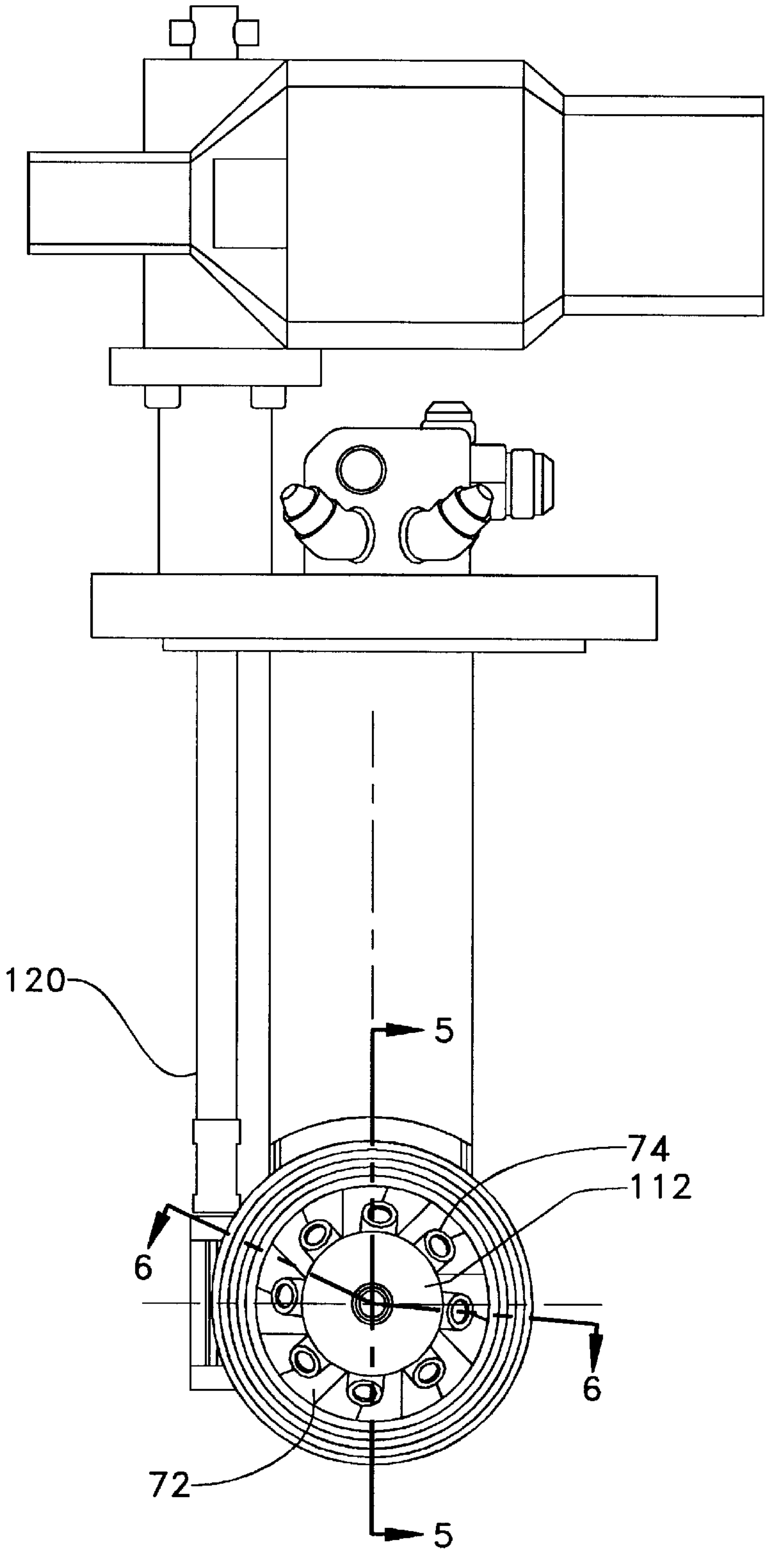
FIG. 4 is a rear view of the dual fuel injector taken along lines 4—4 of FIG. 2.

A plurality of air-blast atomizers 74 are mounted to the injector centerbody 56 and, as best seen in FIG. 4, are equally spaced radially about the injector central axis 44. For example, there may be eight such air-blast atomizers 74.

As shown in FIG. 6, liquid fuel is fed to each air-blast atomizer 74 through a main liquid fuel feed line 76 and a fuel orifice 77 associated with each air-blast atomizer 74. Liquid fuel is fed to the main liquid fuel feed line 76 from a main liquid fuel supply tube (not shown). A plurality of first crossover passages 78 allows fluid communication between the secondary air passage 58 and the annular pilot gaseous fuel passage 54. A plurality of second crossover passages 80 allows fluid communication between the secondary air passage 58 and each air-blast atomizer 74. A plurality of third crossover passages 82 allows fluid communication between the annular pilot gaseous fuel passage 54 and the annular air assist passage 52.

Each air-blast atomizer 74 is generally aligned along an atomizer centerline 84 that is angularly offset from the injector central axis 44 by about 45.0°. However, this angle can be varied over a range of from about 45.0° to about 90.0°, depending upon the application and working conditions in which the dual fuel premix injector 12 is to operate.

Each air-blast atomizer 74 includes an atomizer central air passage 86, an annular atomizer fuel passage 88, and an atomizer outer air passage 90, each centered about the atomizer centerline 84. An outer air orifice 91 in each air-blast atomizer 74 places each atomizer outer air passage 90 in fluid communication with the secondary air passage 58.

A cooling duct divider 92, having perforations 94 therein, and a flared tubular insert 96, having perforations 98 therein, together define a labyrinth-shaped cooling passage 100 that places the second crossover passages 80 in fluid communication with the outer surface of a pilot fuel-air mixing passage 102 having a downstream end 103.

The outer surface of the pilot fuel-air mixing passage 102 includes exterior swirling blades 104, and a conically-shaped pintle swirler 106 is disposed on the interior surface of the pilot fuel-air mixing passage 102. Additionally, swirling blades 108 are disposed within the atomizer fuel passage 88, and swirling blades 110 are disposed in the atomizer outer air passage 90.

The dual fuel premix injector 12 includes an injector centerbody tip 112 having an outer cylindrical wall 113, and an inner cylindrical wall 114 that, together with the pilot fuel-air mixing passage 102, defines an annular, outer pilot air passage 116. Air flowing through the labyrinth-shaped cooling passage 100 cools the injector centerbody tip 112 and the outer cylindrical wall 113 and inner cylindrical wall 114 thereof, as well as the cooling duct divider 92. Significantly, this cooling is achieved without the need for perforations in the injector centerbody tip 112. Cooling without perforations in the injector centerbody tip 112 is advantageous because perforations create stress concentrations in the injector centerbody tip 112 that can lead to premature fatigue failure thereof due to thermal stresses.

Figure 3:
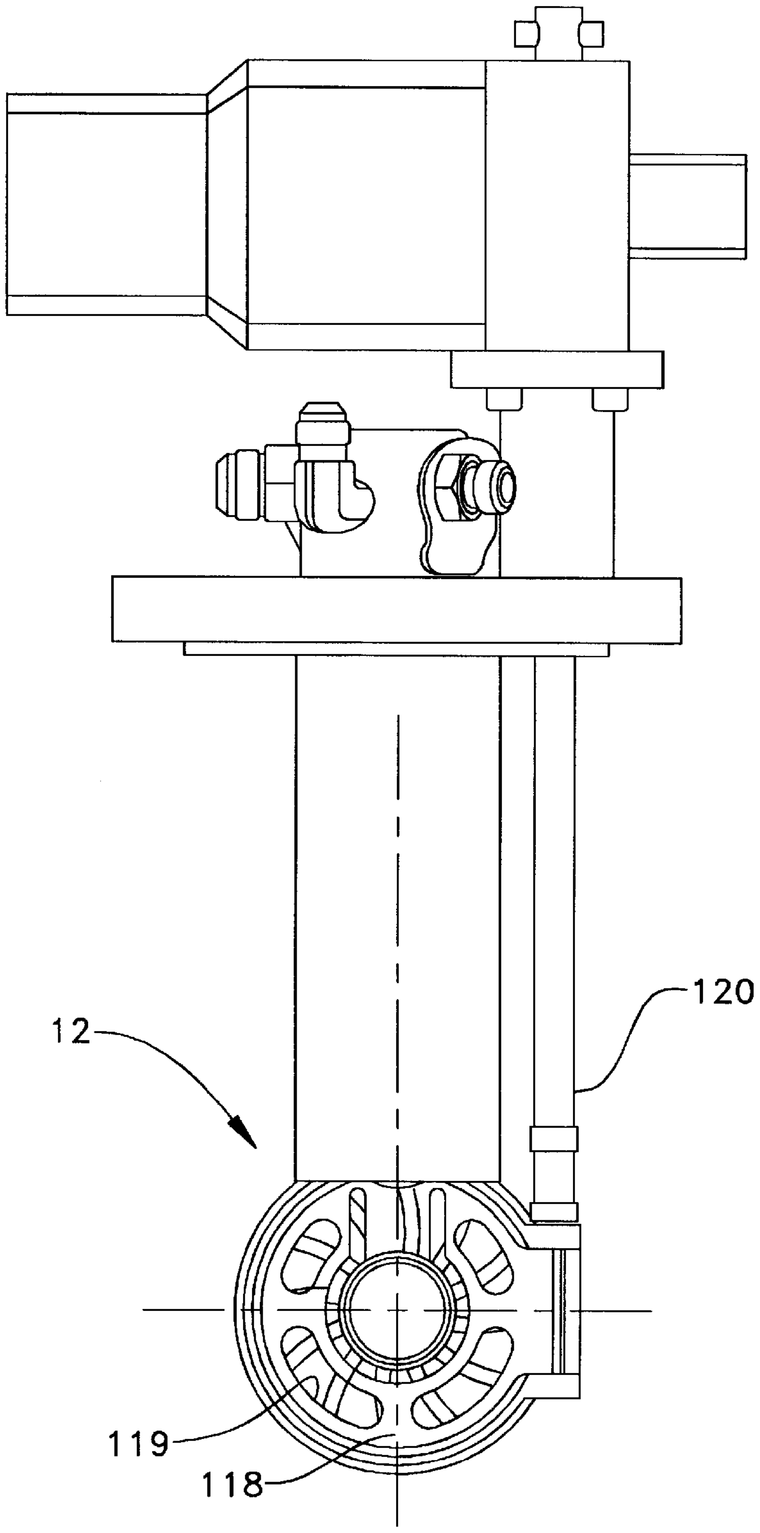
FIG. 3 is a front view of the dual fuel injector taken along lines 3—3 of FIG. 2.

As seen in FIGS. 3 and 6, the dual fuel premix injector 12 includes a main air inlet valve plate 118 and a main air inlet valve pivot rod 120 that is axially rotated to open and close the main air inlet valve plate 118. The main air inlet valve plate includes a plurality of slots 119 radially spaced from the injector central axis 44 a predetermined dimension. The main air inlet valve plate 118 is held closed, as seen in FIGS. 3 and 6, during operation of the gas turbine engine 10 when gaseous fuel is used and during startup using gaseous fuel. The main air inlet valve plate 118 is opened by the main air inlet valve pivot rod 120 to allow more air to enter the main air passage 64 from the compressor section 20 (FIG. 1) during operation of the gas turbine engine 10 when liquid fuel is used. As seen in FIG. 6, even when the main air inlet valve plate 118 is in a closed position, the main air inlet valve plate 118 does not cover the secondary air passage 58.

Figure 5:
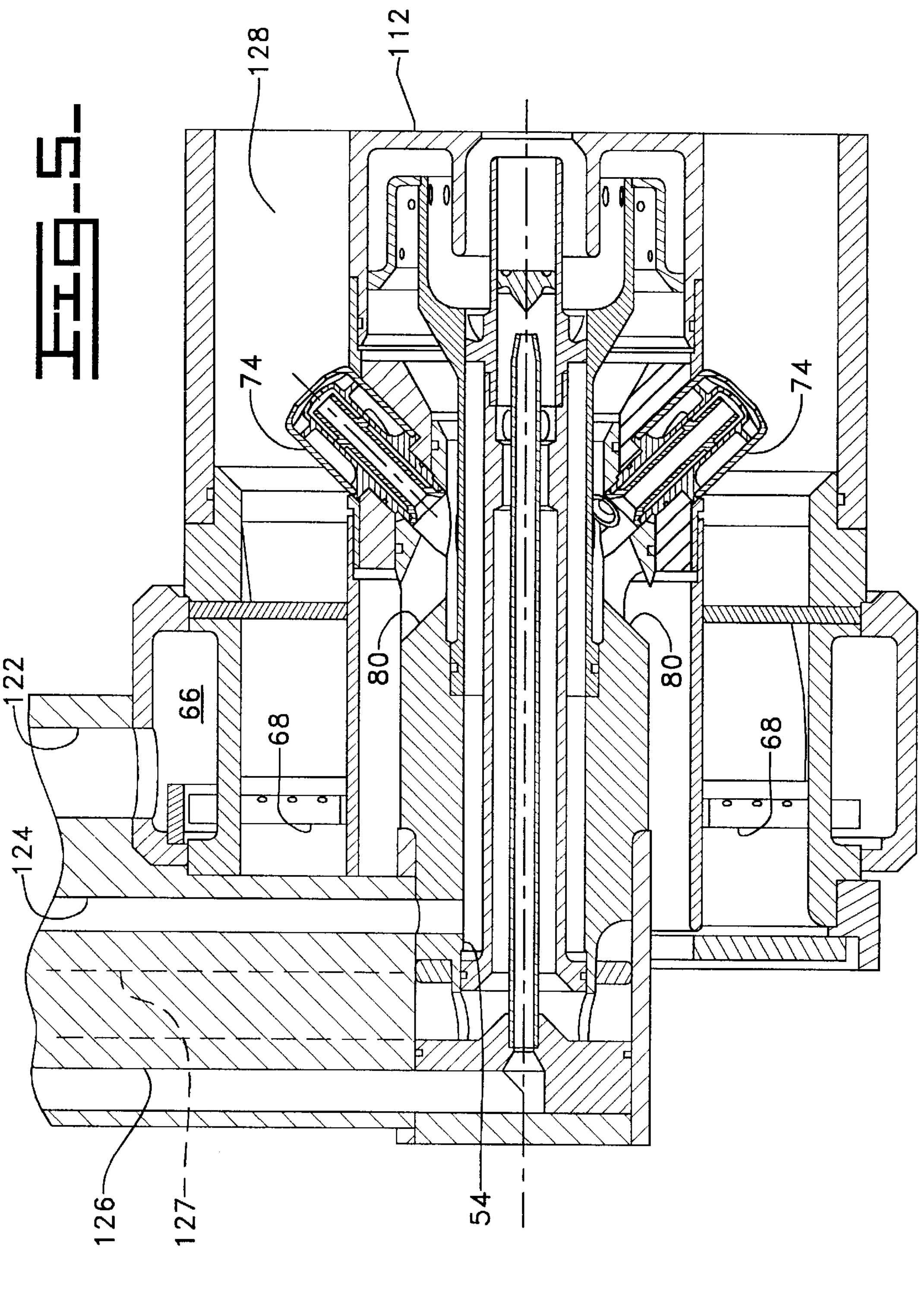
FIG. 5 is an enlarged partial cross-sectional view of a portion of the dual fuel injector taken along lines 5—5 of FIG. 4.

As seen in FIG. 5, a main gaseous fuel supply tube 122 is in fluid communication with the annular main gaseous fuel manifold cavity 66. A pilot gaseous fuel supply tube 124 is in fluid communication with the annular pilot gaseous fuel passage 54. A pilot liquid fuel supply tube 126 is in fluid communication with the inlet end 48 of the liquid pilot fuel feed line 46. An air assist supply tube 127 provides compressed air to the annular air assist passage 52 from an external source, such as a "shop air" system or a dedicated compressor.

INDUSTRIAL APPLICABILITY

The dual fuel premix injector 12 operates as follows. Compressed air from the compressor section 20 enters the main air passage 64 and the secondary air passage 58 from the left hand side of the dual fuel premix injector 12, as seen in FIGS. 1, 2, 5, and 6. When the gas turbine engine 10 is operating using main gaseous fuel, the main air inlet valve plate 118 is closed and compressed air from the compressor section 20 passes into the main air passage 64 through the slots 119 in the main air inlet valve plate 118. This compressed air mixes with gaseous fuel which is introduced from the main gaseous fuel supply tube 122 to the annular main gaseous fuel manifold cavity 66 and then to the main air passage 64 through the hollow spoke members 68 and the passages 70 therein. The gaseous fuel-air mixture next passes through the main air swirling vanes 72 and is further mixed thereby before entering an annular mixing chamber 128 located at the downstream side (right hand side, as seen in FIG. 6) of the dual fuel premix injector 12. After exiting the annular mixing chamber 128, the gaseous fuel-air mixture is burned in the annular combustor 32.

If pilot gaseous fuel is to be used, for example, for starting (lightoff) of the gas turbine engine 10, the main air inlet valve plate 118 is closed. Air introduced from the compressor section 20 into the secondary air passage 58 passes through the first crossover passages 78 and mixes with gaseous fuel, that flows from the pilot gaseous fuel supply tube 124, in the annular pilot gaseous fuel passage 54. Part of this pilot gaseous fuel-air mixture then is swirled by the exterior swirling blades 104 and the remainder of the pilot gaseous fuel-air mixture is diverted through the third crossover passages 82 into the annular air assist passage 52. The diverted portion of the pilot gaseous fuel-air mixture is swirled by the conically-shaped pintle swirler 106. The pilot gaseous fuel-air mixture swirled by the exterior swirling blades 104 is reunited with the pilot gaseous fuel-air mixture swirled by the conically-shaped pintle swirler 106 at the downstream end 103 of the pilot fuel-air mixing passage 102 for ignition in the annular combustor 32.

When the gas turbine engine 10 is operating using main liquid fuel, the main air inlet valve plate 118 is open and compressed air from the compressor section 20 flows into the main air passage 64 without being impeded by the main air inlet valve plate 118. The compressed air in the main air passage 64, after passing through the main air swirling vanes 72, mixes with liquid fuel that is introduced by the air-blast atomizers 74. Each air-blast atomizer 74 operates as follows. Compressed air passes from the secondary air passage 58 through the second crossover passages 80 and into the atomizer central air passage 86 where it flows upwardly and to the right as seen in the cross section of the air-blast atomizer 74 shown in FIG. 6. Compressed air is also fed from the secondary air passage 58, through the outer air orifice 91, into the atomizer outer air passage 90 where it is swirled by the swirling blades 110 as it flows upwardly and to the right as seen in the cross section of the air-blast atomizer 74 shown in FIG. 6.

Meanwhile, liquid fuel, introduced into the atomizer fuel passage 88 from the main liquid fuel feed line 76 through the fuel orifice 77, is swirled by the swirling blades 108 within the atomizer fuel passage 88 as the liquid fuel flows upwardly and to the right as seen in the cross section of the air-blast atomizer 74 shown in FIG. 6. The swirling of the liquid fuel causes it to form a film on the wall of the atomizer fuel passage 88 as it exits the atomizer fuel passage 88. The film of fuel is simultaneously broken up into droplets (atomized) and mixed with air upon exiting the air-blast atomizer 74. This atomizing and mixing action is due to the shearing forces applied to the film of fuel as it is caught between the compressed air exiting from the atomizer central air passage 86, flowing at a first atomizer air mass flow rate, and the swirling compressed air exiting from the atomizer outer air passage 90, flowing at a second atomizer air mass flow rate different from the first atomizer air mass flow rate. This liquid fuel-air mixture is further mixed with swirling air from the main air passage 64 in the annular mixing chamber 128 before being ignited in the annular combustor 32.

If liquid pilot fuel is to be used, for example, for starting (lightoff) of the gas turbine engine 10, the main air inlet valve plate 118 may be closed but is usually held open. The liquid pilot fuel is introduced into the liquid pilot fuel feed line 46. Air introduced into the secondary air passage 58 passes through the first crossover passages 78 and into the annular pilot gaseous fuel passage 54. Part of the air in the annular pilot gaseous fuel passage 54 is then swirled by the exterior swirling blades 104. The remainder of the air in the annular pilot gaseous fuel passage 54 is diverted through the third crossover passages 82 into the annular air assist passage 52 where it mixes with additional compressed air supplied to the annular air assist passage 52 from the air assist supply tube 127.

The air from the third crossover passages 82 and the compressed air from the annular air assist passage 52 and the liquid pilot fuel from the outlet end 50 of the liquid pilot fuel feed line 46 pass through the conically-shaped pintle swirler 106, causing the liquid pilot fuel to form a uniform film on the interior of the pilot fuel-air mixing passage 102. As the film of liquid pilot fuel exits the pilot fuel-air mixing passage 102, it is simultaneously broken up into droplets (atomized) and mixed with air. This atomizing and mixing action is due to the the compressed air exiting from within the pilot fuel-air mixing passage 102 at a first pilot air mass flow rate, and the swirling compressed air from the exterior of the pilot fuel-air mixing passage 102, at a second pilot air mass flow rate different from the first pilot air mass flow rate, that is also mixed with air from the labyrinth-shaped cooling passage 100. The liquid pilot fuel-air mixture is then ignited in the annular combustor 32.

The use of compressed air in the interior of the pilot fuel-air mixing passage 102 provides for a wide operating range for lightoff, i.e. even when there is a low pressure drop across the dual fuel premix injector 12. This wide operating range is possible because the compressed air in the interior of the pilot fuel-air mixing passage 102 prevents the film of liquid pilot fuel from collapsing upon itself as the film of liquid pilot fuel exits the pilot fuel-air mixing passage 102. Such a collapse of the film of liquid pilot fuel would prevent proper droplet formation from occurring under some operating conditions, such as when there is a low pressure drop across the dual fuel premix injector 12. A relatively narrow pilot liquid spray pattern having a cone angle of from about 40.0° to about 45.0°, while using a ratio of second pilot air mass flow rate through the annular outer pilot air passage 116 to first pilot air mass flow rate through the pilot fuel-air mixing passage 102 of about 2.5:1.0, has been found to provide acceptable performance while avoiding the impingement of liquid pilot fuel onto the injector centerbody 56 that can result in carbon buildup. However, the optimal spray pattern characteristics will vary depending upon the application and working conditions in which the dual fuel premix injector 12 is to operate.

The configuration of the dual fuel premix injector 12 in accordance with the present invention provides numerous performance advantages. The labyrinth-shaped cooling passage 100 provides enhanced cooling of the injector centerbody tip 112. Because the hollow spoke members 68 are located upstream of the main air swirling vanes 72 that are in turn upstream of the air-blast atomizers 74, the potential for liquid fuel droplets migrating upstream and contaminating the annular main gaseous fuel manifold cavity 66 and/or the passages 70 in the hollow spoke members 68, for example with coke, is prevented. Low-cycle fatigue cracking of the injector centerbody tip 112 due to thermal stresses is reduced because of the enhanced air cooling of the injector centerbody tip 112. The use of relatively large diameter passages for the liquid pilot and main fuel avoids problems commonly associated with injectors having smaller passages, such as plugging or clogging of passages due to minute amounts of contaminants. Coke formation on the interior surface of the annular mixing chamber 128 is minimized due to the optimal main liquid fuel droplet size and pattern achieved by the dual fuel premix injector 12. Similarly, coke formation on the injector centerbody tip 112 is minimized due to the optimal pilot liquid fuel droplet size and pattern achieved by the dual fuel premix injector 12.

The dual fuel premix injector 12 is nominally intended to operate on either natural gas or diesel fuel, with the capability of starting the gas turbine engine 10 on either fuel and transferring between fuels while the gas turbine engine 10 is operating. The design of the dual fuel premix injector 12 also allows the gas turbine engine 10 to operate using both gaseous and liquid fuel simultaneously. The dual fuel premix injector 12 allows the gas turbine engine 10 to achieve low emissions of oxides of nitrogen while operating on either natural gas or liquid fuel through lean-premixed combustion, without other dilutents such as water or steam.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A fuel injector comprising:

a plurality of fuel atomizers mounted to a fuel injector centerbody, each adapted to carry a flow of fuel for mixing with a flow of air and each including an inner air passage, an outer air passage, and a fuel passage disposed between the inner air passage and the outer air passage.

2. A fuel injector comprising:

a plurality of fuel atomizers, each adapted to carry a flow of fuel for mixing with a flow of air and each including an inner air passage, an outer air passage, and a fuel passage disposed between the inner air passage and the outer air passage;

a main air passage having a central axis; and a centerbody disposed radially inwardly of the main air passage;

wherein the fuel atomizers are mounted to the centerbody and spaced around the central axis and carry the flow of fuel to the main air passage.

3. The fuel injector of claim 2, wherein each fuel atomizer is canted at an angle with respect to the central axis.

4. The fuel injector of claim 3, wherein the angle is in a range of from about 45.0° to about 90.0°.

5. The fuel injector of claim 2, wherein each fuel passage includes means for generating vorticity in the flow of fuel.

6. The fuel injector of claim 5, wherein the fuel flow vorticity generating means comprises one or more fuel swirler blades.

7. The fuel injector of claim 2, wherein each outer air passage includes means for generating vorticity in the flow of air.

8. The fuel injector of claim 7, wherein the vorticity generating means comprises one or more swirler blades.

9. A fuel injector comprising:

a main air passage having a central axis;

a centerbody disposed radially inwardly of the main air passage; and a plurality of main fuel atomizers mounted to the centerbody and spaced around the central axis for carrying a flow of fuel to the main air passage each of said main fuel atomizer being canted at an angle with respect to the central axis.

10. The fuel injector of claim 9, wherein the angle is in a range of from about 45.0° to about 90.0°.

11. The fuel injector of claim 9, wherein each main fuel atomizer includes an inner air passage, an outer air passage, and a fuel passage disposed between the inner air passage and the outer air passage and wherein each fuel passage includes means for generating vorticity in the flow of fuel.

12. The fuel injector of claim 11, wherein the fuel flow vorticity generating means comprises one or more fuel swirler blades.

13. The fuel injector of claim 9, wherein each outer air passage includes means for generating vorticity in the flow of air.

14. The fuel injector of claim 13, wherein the vorticity generating means comprises one or more swirler blades.

15. A dual fuel injector comprising:

a first fuel supply;

a second fuel supply, being a main supply of gaseous fuel; and a main air passage;

wherein the main air passage includes means for generating vorticity in a flow of air therein and wherein the main supply of gaseous fuel comprises a plurality of gaseous fuel nozzles located upstream of the main air passage vorticity generating means;

said first fuel supply being a main liquid fuel feed line; and a plurality of main liquid fuel atomizers in fluid communication with the main fuel feed line and the main air passage and located downstream of the main air passage vorticity generating means.

16. The dual fuel injector of claim 15, further including a pilot fuel-air mixing passage having an interior surface and including means for generating vorticity in a flow of a liquid fuel-air mixture in the pilot fuel-air mixing passage.

17. The dual fuel injector of claim 16, wherein the liquid fuel-air mixture vorticity generating means includes means for diverting the flow of liquid fuel toward the interior surface of the pilot fuel-air mixing passage.

18. The dual fuel injector of claim 17, wherein the diverting means includes a conically-shaped pintle swirler.

19. The dual fuel injector of claim 16, wherein the liquid fuel-air mixture vorticity generating means comprises one or more liquid fuel-air swirler blades.

20. A dual fuel injector comprising:

a first fuel supply;

a second fuel supply;

an unperforated injector centerbody tip including a cylindrical wall;

a cooling air passage for providing cooling air to the cylindrical wall; and a plurality of fuel atomizers, each adapted to carry a flow of fuel for mixing with a flow of air and each including an inner air passage, an outer air passage, and a fuel passage disposed between the inner air passage and the outer air passage.

21. The dual fuel injector of claim 20, wherein the cooling air passage is labyrinth-shaped.

22. The dual fuel injector of claim 20, wherein the inner air passage is adapted to carry air at a first mass flow rate and the outer air passage is adapted to carry air at a second mass flow rate different from the first mass flow rate for applying shearing forces to fuel emerging from the fuel passage to break the fuel up into droplets.

23. The dual fuel injector of claim 20, further including:

said second fuel supply being a gaseous main fuel supply; and a main air passage;

wherein the main air passage includes means for generating vorticity in a flow of air therein and wherein the gaseous main fuel supply comprises a plurality of gaseous fuel nozzles located upstream of the main air passage vorticity generating means.

24. The dual fuel injector of claim 23, having an atomizer located downstream of the main air passage vorticity generating means.

25. The dual fuel injector of claim 23, further including a plurality of fuel atomizers, each adapted to carry a flow of fuel for mixing with a flow of air and each including an inner air passage, an outer air passage, and a fuel passage disposed between the inner air passage and the outer air passage.

26. A method of mixing main liquid fuel with air in a fuel injector, the fuel injector including a main liquid fuel feed line and a fuel-air mixing chamber, the method comprising the steps of:

providing a plurality of atomizers, each including an annular atomizer fuel passage in fluid communication with the main liquid fuel feed line, a central air passage disposed radially inwardly of the annular atomizer fuel passage and an outer air passage disposed radially outwardly of the annular atomizer fuel passage; and for each of the atomizers:

introducing fuel into the annular atomizer passage to create a cylindrically shaped film of fuel that exits the annular atomizer fuel passage, each of said atomizer being oriented in a direction whereby the general direction of the flow of air introduced in the fuel-air mixing chamber is oblique to the general direction of the flow of the fuel droplets mixed with air as ejected from the atomizer.

27. The method of claim 26, further including the step of generating vorticity in the fuel flowing through each annular atomizer fuel passage.

28. The method of claim 26, further including the step of generating vorticity in the air flowing through each outer air passage.

29. The method of claim 26, further including the step of generating vorticity in the additional air introduced in the fuel-air mixing chamber.

30. The method of claim 26, wherein each atomizer is oriented in a direction whereby the general direction of the flow of air introduced in the fuel-air mixing chamber is oriented at angle of from about 45.0° to about 90.0° to the general direction of the flow of the fuel droplets mixed with air as ejected from the atomizer.

* * * * *